(12) United States Patent
Alliot et al.

(10) Patent No.: US 11,933,888 B2
(45) Date of Patent: Mar. 19, 2024

(54) PROCESS FOR MONITORING VEHICLES BY A PLURALITY OF SENSORS

(71) Applicant: IDEMIA IDENTITY & SECURITY FRANCE, Courbevoie (FR)

(72) Inventors: Samuel Alliot, Courbevoie (FR); Grégoire Carrion, Courbevoie (FR); Eric Guidon, Courbevoie (FR); Nicolas Fougeroux, Courbevoie (FR)

(73) Assignee: IDEMIA IDENTITY & SECURITY FRANCE, Courbevoie (FR)

( * ) Notice: Subject to any disclaimer, the term of this patent is extended or adjusted under 35 U.S.C. 154(b) by 260 days.

(21) Appl. No.: 17/443,373

(22) Filed: Jul. 26, 2021

(65) Prior Publication Data
US 2022/0035022 A1 Feb. 3, 2022

(30) Foreign Application Priority Data

Jul. 31, 2020 (FR) ...................................... 2008190

(51) Int. Cl.
*G01S 13/931* (2020.01)
*G06V 20/58* (2022.01)
*G01S 13/00* (2006.01)

(52) U.S. Cl.
CPC ............ *G01S 13/931* (2013.01); *G06V 20/58* (2022.01); *G01S 2013/932* (2020.01); *G01S 2013/9325* (2013.01)

(58) Field of Classification Search
None
See application file for complete search history.

(56) References Cited

U.S. PATENT DOCUMENTS

| 2009/0046897 A1 * | 2/2009 | Rowsell | .................. | G08G 1/04 382/107 |
| 2015/0219758 A1 | 8/2015 | Gammenthaler et al. | | |

(Continued)

FOREIGN PATENT DOCUMENTS

| DE | 102010012811 A1 * | 9/2011 | ............. G08G 1/052 |
| DE | 102010012811 A1 | 9/2011 | |
| DE | 102014008732 A1 | 12/2015 | |

OTHER PUBLICATIONS

Roy A, et al., "Fusion of Doppler Radar and video information for automated traffic surveillance", Information Fusion, 2009. Fusion '09. 12th International Conference On, IEEE, Piscataway, NJ, USA, (Jul. 6, 2009), entire document.

*Primary Examiner* — Bernarr E Gregory
(74) *Attorney, Agent, or Firm* — WOMBLE BOND DICKINSON (US) LLP

(57) ABSTRACT

The invention relates to a process for monitoring vehicles on a road by a system comprising at least one radar sensor and a second sensor different from the radar sensor, wherein the second remote sensor is a time-of-flight optical sensor or optical image sensor, the process comprising a temporal readjustment and a spatial matching in order to obtain a set of measurement points each assigned to first characteristics derived from the radar data and second characteristics derived from the optical data, the determination of the radar vehicle trackings and of the optical vehicle trackings, a comparison of similarity between the radar vehicle trackings and the optical vehicle trackings, the elimination of the radar vehicle trackings for which no optical vehicle tracking is similar, the process comprising monitoring a parameter derived from first characteristics of a retained radar vehicle tracking.

8 Claims, 2 Drawing Sheets

(56) References Cited

U.S. PATENT DOCUMENTS

2020/0242922 A1\* 7/2020 Dulberg ................. G08G 1/012
2021/0024069 A1\* 1/2021 Herman ............... G08G 1/0125

\* cited by examiner

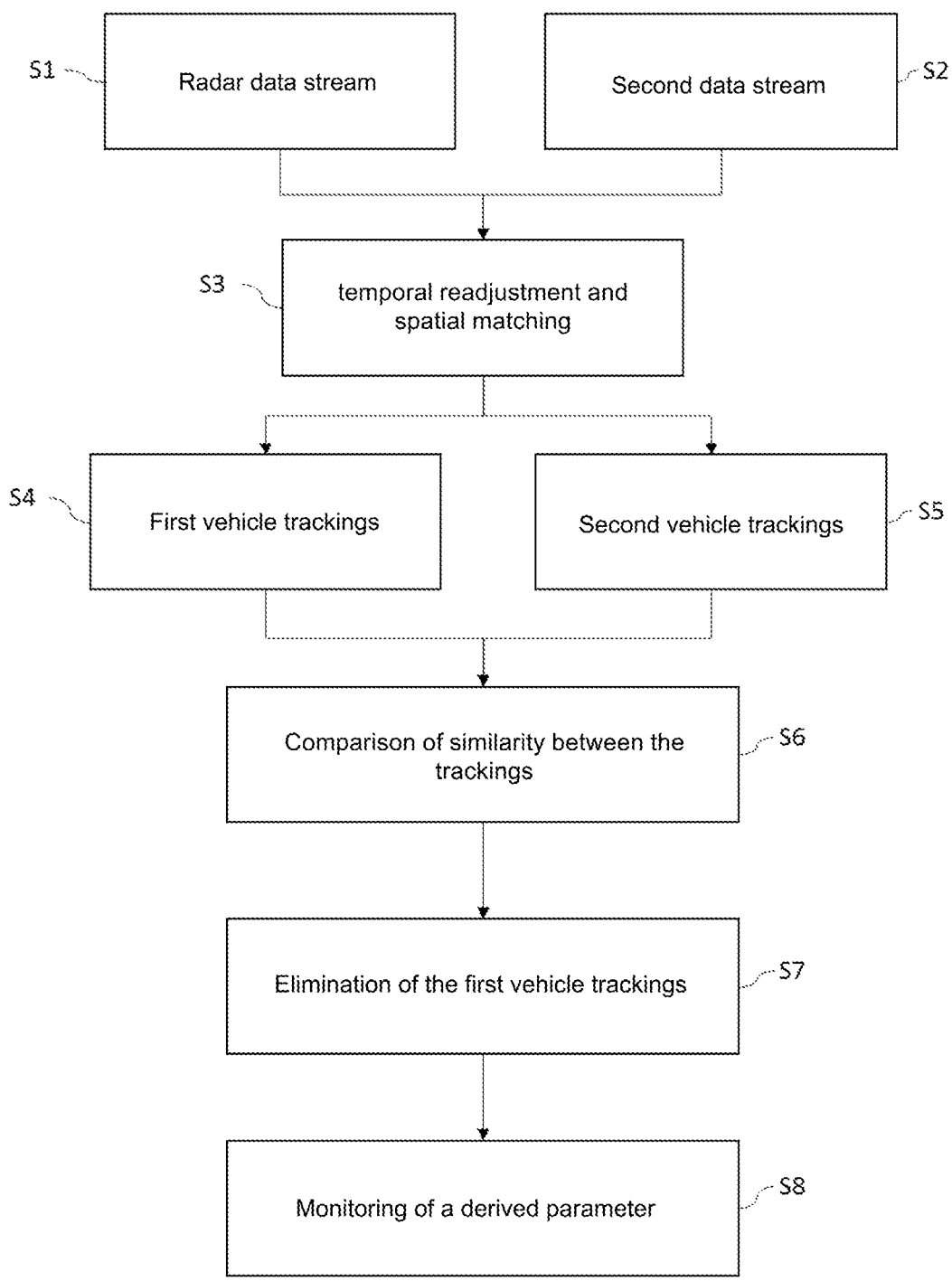

PROCESS FOR MONITORING VEHICLES BY A PLURALITY OF SENSORS

CROSS-REFERENCE TO RELATED APPLICATIONS

This application claims priority pursuant to 35 U.S.C. 119(a) to France Patent Application No. 2008190, filed Jul. 31, 2020, which application is incorporated herein by reference in its entirety.

TECHNICAL FIELD

The present invention belongs to the field of monitoring vehicles on a road traffic lane, and more specifically relates to a process for monitoring vehicles on a road by a system for monitoring vehicles comprising at least one radar sensor, the system being arranged in a fixed manner outside of the traffic lanes of the road.

TECHNOLOGICAL BACKGROUND

Monitoring vehicles consists in overseeing the vehicles driving on traffic lanes of a road and in monitoring a traffic parameter of a vehicle in order to verify if this traffic parameter is in agreement with a regulation relating to same. The most common traffic parameter is the speed of the vehicles, and the monitoring of vehicles then consists in verifying that the speed of each vehicle is below a threshold. Other traffic parameters can be monitored. For example, in the case of monitoring the crossing of a line or compliance with traffic lights, a monitored traffic parameter may be the position of the vehicle, with the latter having to not be at certain locations at certain times. Since the aim of monitoring vehicles is to detect violations and therefore to issue fines for vehicles for which the monitored traffic parameter had an unauthorized value, said monitoring must therefore be based on very precise measurements. Typically, the uncertainties in measurements must be less than allowances for the monitoring of the traffic parameter. For example, in monitoring speed, this allowance may be 3 km/h below 100 km/h and 3% above 100 km/h. Furthermore, monitoring must be quick, in order to potentially enable the implementation of an action such as setting off a flash in order to acquire an image showing the vehicle in the process of committing the violation.

Due to its ease of use and the precision of its speed measurements, a traffic enforcement radar is the favored instrument for measuring the speed of vehicles driving on a road using electromagnetic waves with a wavelength of the order of a centimeter. A radar uses the principle of the Doppler effect to measure speed. It emits a sustained (or continuous) wave into a radar detection range which is reflected by any object located in the radar detection range. Due to the Doppler effect, this reflected wave has a slightly different frequency to that emitted: a larger frequency for objects approaching the radar, and a smaller one for those moving away from it. By measuring the difference in frequency between the emitted wave and the returned wave, it is possible to calculate the speed of a target object such as a vehicle. This is done by finding the beat frequency between the two waves. A position measurement is provided by the measurement of the time of flight of the wave, which makes it possible to obtain the distance between the radar and the target vehicle which reflected the wave. The distance measurement is supplemented by a measurement of the angle of the target vehicle, carried out by measuring a phase shift between the signals received on at least two antennae. Knowing the position makes it possible for example to implement monitoring of crossing a line or of road traffic lights.

By virtue of its qualities, radar is the most commonly used instrument for monitoring moving vehicles. This is because radar has the advantage of offering a long range, a very good discrimination regarding speed by virtue of the Doppler effect, a good discrimination regarding distance by virtue of the time of flight, and a very good robustness to environmental conditions. However, radar suffers from a number of disadvantages which limit certain uses.

In a wide detection range, multiple bounces are created between vehicles or between vehicles and the environment. These multiple bounces may create false detections, i.e. false tracking of a vehicle. It is then necessary to filter the tracking to eliminate those trackings which may correspond to false tracking, to the detriment of a good detection efficiency. In real terms, this means identifying two trackings corresponding to close vehicles with close speeds, and deleting at least one (typically the furthest) or both thereof. Therefore, some vehicles may sometimes not be monitored.

In addition, it is generally necessary to have a significant number of measurements for a tracking to be able to precisely confirm a trajectory (and therefore a position). This is because radar suffers from low angular resolution, and a low refresh rate due to the large number of echoes to be processed in its wide detection range. Radar tracking is therefore made difficult at short distances, and vehicle monitoring is delayed thereby, which may be problematic for example when the monitoring is carried out behind vehicles which are moving further away.

Moreover, the Doppler effect on which the radar is based does not appear when a vehicle is stationary. A stationary vehicle is therefore much more difficult to dissociate from the static environment. This then requires a basic processing of the type starting from the tracking of the moving vehicle, stitching together in time the stationary and started-up phases. This stitching together is not robust to pedestrians or bicycles which pass the stationary vehicle. There may therefore be tracking losses in the case of stationary vehicles, thereby preventing for example the monitoring of stop bans in specific zones.

Finally, it may be advantageous to be able to determine the type or the class of a vehicle in order to be able to carry out specific monitoring based on this class. For example, heavy trucks may be subject to lower speed limits than light vehicles, or else certain classes of vehicles may be subject to driving bans on specific roads or passing bans while other classes of vehicles are not subject thereto. Radar only enables an approximate classification of vehicles based on the number of echoes received and the intensity thereof.

Systems comprising at least one optical sensor and a radar sensor were proposed to improve reliability of the vehicle speed detection. Patent application US2015/219758 describes a system for generating video data, which comprises a mobile radar system configured to generate radar frame data comprising data of one or several vehicles, a mobile video system configured to generate video frame data including speed data for one or several vehicles, and a dynamic plane rotation system coupled to the mobile radar system and configured to map the vertically tilted radar frame data onto a flat plane parallel to a roadway to generate mapped data for one or several vehicles including the radar speed data displayed alongside the location of the vehicle in the video data. Also, patent application DE102010012811 describes a method for measuring speeds and assign measured speeds to appropriate vehicles by using an object tracking sensor (for example a laser scanner or a radar) and an image tracking sensor (for example a camera). These approaches propose to consider only trackings which are correlated together, which entails losing data and not monitoring some vehicles.

BRIEF DESCRIPTION OF THE INVENTION

The aim of the invention is to remedy at least partly some of these disadvantages and preferably all of them, and it aims in particular to propose a process for monitoring vehicles on a road by a system comprising at least one radar sensor and an optical sensor, in order to overcome the limitations of the Doppler technology implemented by the radar. In particular, the use of a lidar sensor or an image sensor as optical sensor makes it possible to improve the tracking of the vehicles by eliminating false tracking caused by multiple bounces of the radar wave.

To this end, a process for monitoring vehicles on a road comprising at least two traffic lanes is proposed, by a system for monitoring vehicles arranged in a fixed manner and comprising at least one radar sensor and a second remote sensor different from the radar sensor, the radar sensor operating over a radar detection range of the road covering at least two traffic lanes and emitting a stream of radar data representative of the detection of vehicles on the road, the second remote sensor operating over a second detection range of the road, the radar detection range and the second detection range being at least partially superimposed, wherein the second remote sensor is an optical sensor emitting a stream of optical data representative of the detection of vehicles on the road, said optical sensor being a time-of-flight optical sensor or an optical image sensor, the process comprising, in a continually repeated manner for a plurality of successive frames:

temporal readjustment and spatial matching in a fixed shared spatial marker of the radar data and of the optical data in order to obtain a set of measurement points each assigned to first characteristics derived from the radar data comprising position measurements and speed measurements, and second characteristics derived from the optical data, the second characteristics comprising at least position measurements, comprising:
        a first segmentation which groups together, in first clusters, measurement points having first characteristics derived from radar data evolving in a similar way over several consecutive frames, the following over time of a first cluster forming a radar vehicle tracking,
        a second segmentation which groups together, in second clusters, measurement points having second characteristics derived from optical data evolving in a similar way over several consecutive frames, the following over time of a second cluster forming an optical vehicle tracking,
    determination of radar vehicle trackings from the first characteristics derived from the radar data and optical vehicle tracking from the second characteristics derived from the optical data,
    comparison of similarity between the radar vehicle trackings and the optical vehicle trackings, the comparison of similarity being based at least on the presence of shared measurement points over several consecutive frames, and matching of similar radar and optical vehicle trackings,
    elimination of the radar vehicle trackings for which no optical vehicle tracking is similar, in order to retain only the radar vehicle trackings for which at least one optical vehicle tracking is similar, the process comprising:
    monitoring a parameter derived from first characteristics of a retained radar vehicle tracking, and wherein, after the comparison of similarity between the radar vehicle trackings and the optical vehicle trackings, when an optical vehicle tracking does not have any similar radar vehicle tracking, the monitored parameter is derived from first characteristics derived from radar data corresponding to measurement points of the second aggregated of said optical vehicle tracking.

The method is advantageously supplemented by the following characteristics, taken alone or in any of their technically possible combinations:

the system for monitoring vehicles 1 is arranged in a fixed manner outside the traffic lanes of the road, at at least 0.5 m from the edge of a traffic lane and at a height of greater than 1.2 m from a surface of said traffic lanes;
    the second characteristics of an optical vehicle tracking comprise dimensions of the vehicle, the monitoring of a parameter comprising assigning, based on the dimensions assigned to said vehicle, a dimension class to said optical vehicle tracking and/or to a retained radar vehicle tracking similar to said optical vehicle tracking, the parameter being monitored based on the dimension class;
    the parameter monitored is derived from first speed measurements determined by means of the radar;
    following the comparison of similarity between the radar vehicle trackings and the optical vehicle trackings, a radar vehicle tracking is maintained when said radar vehicle tracking previously had a similar optical vehicle tracking;
    the optical sensor is an optical image sensor that acquires images of the second detection range of the road, and the emitting of the stream of optical data representative of the detection of vehicles on the road comprises an analysis of the images acquired, involving a pattern recognition in order to carry out a second segmentation which groups together, in second clusters, measurement points having second characteristics that evolve in a similar manner over time; or
    the optical sensor is a lidar sensor.

The invention also relates to a system for monitoring vehicles comprising at least one radar sensor and a second remote sensor different from the radar sensor, the second remote sensor being an optical sensor, said optical sensor being a time-of-flight optical sensor or an optical image sensor, the system for monitoring vehicles being configured to be arranged in a fixed manner in the vicinity of a road comprising at least two traffic lanes, the radar sensor being configured to operate over a radar detection range of the road covering at least two traffic lanes and to emit a stream of radar data representative of the detection of vehicles on the road, the optical sensor being configured to operate over a second detection range of the road covering at least two traffic lanes and to emit a second stream of optical data representative of the detection of vehicles on the road, the radar detection range and the second detection range being at least partially superimposed, the system for monitoring vehicles being configured to implement the process according to the invention.

DESCRIPTION OF THE FIGURES

The invention will be better understood through the description below, which relates to embodiments and variants according to the present invention, given as non-limiting examples and explained with reference to the attached schematic drawings, in which:

FIG. 2 is a diagram showing the main steps of a process for monitoring vehicles according to a possible embodiment of the invention.

DETAILED DESCRIPTION

Figure 1:
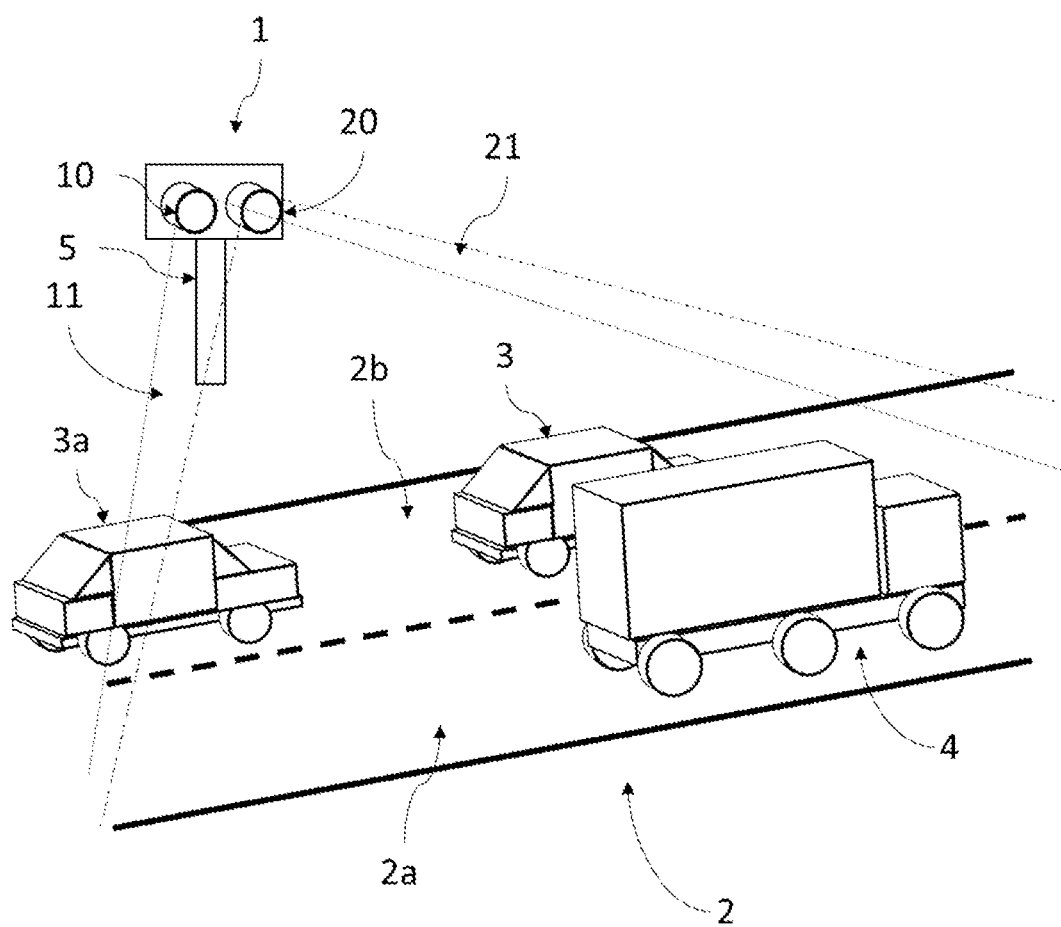
FIG. 1 shows an example arrangement of a vehicle monitoring system in the vicinity of traffic lanes on a road where vehicles are passing, according to a possible embodiment of the invention.

Referring to [FIG. 1], a system for monitoring vehicles 1 is positioned in a fixed manner in the vicinity of a road 2 enabling vehicular traffic. The road 2 may be any traffic location on which vehicles 3, 4 are moving: a highway, street, etc. The road 2 preferably comprises at least two traffic lanes 2a, 2b, enabling vehicular traffic 3, 4 between the edges thereof. The road 2 is delimited by a surface coating designed especially for road traffic, typically a bituminous concrete. The traffic lanes 2a, 2b are generally delimited by a road marking on the surface of the road, i.e. marking consisting of visual signs placed on the surface of the road.

The system for monitoring vehicles 1 is positioned in a fixed manner relative to the traffic lanes 2a, 2b of the road 2, and outside the traffic lanes 2a, 2b of the road 2. The system for monitoring vehicles 1 is preferably located at least 0.5 m from the edge of a traffic lane the vehicular traffic of which it is monitoring, in order to have sufficient space, and preferably at at least 1 m from the edge of the traffic lane. Also preferably, the system for monitoring vehicles is arranged at a height of greater than 1.2 m from the surface of said traffic lanes 2a, 2b, preferably at a height of greater than 2 m from the surface of said traffic lanes 2a, 2b, and more preferably greater than 3 m. To this end, the system for monitoring vehicles 1 may be arranged on a mast 5 as in the shown example. The arrangement of the system for monitoring vehicles 1 high up makes it possible to limit the concealing of the detection ranges of the sensors of the system for monitoring vehicles 1, at least for the majority of light vehicles, such as the car 3 located in front of the truck 4 in the example.

The system for monitoring vehicles 1 comprises a radar sensor 10 operating over a radar detection range 11 of the road 2 covering at least two traffic lanes, the limits of which are shown in FIG. 1 by dashed lines. The radar 10 is configured to emit a stream of radar data representative of the detection of vehicles 3, 4 on the road 2. As explained above, the radar 10 utilizes at least the Doppler effect in order to determine at least speed measurements. Preferably, The radar also utilizes time-of-flight technology, which makes it possible to determine the distance between the radar 10 and the target vehicle which reflected the wave, thereby providing positional information. The radar 10 is preferably a microwave frequency radar with electromagnetic waves emitted at a frequency of greater than 1 GHz.

The system for monitoring vehicles 1 also comprises at least one second remote sensor 20 operating over a second detection range 21 of the road 2. The second remote sensor 20 is configured to emit a second stream of data representative of the detection of vehicles 3, 4 on the road 2. The radar detection range 11 and the second detection range 21 are at least partially superimposed, with at least the majority of the second detection range 21 being in the radar detection range 11. Preferably, the radar detection range 11 and the second detection range 21 have maximum overlap at least over the portion of the traffic lanes 2a, 2b of the road 2 the traffic of which has to be monitored, the idea being that a vehicle 3, 4 moving thereon is located both in the radar detection range 11 and the second detection range 21, so that both the radar data and the second data are liable to be representative of the detection of said vehicle 3, 4.

The second remote sensor 20 is an optical sensor which therefore emits optical data. This optical sensor 20 may be a time-of-flight optical sensor, for example a lidar, or an optical image sensor acquiring two-dimensional images of the detection range, for example a CCD or CMOS sensor. The optical sensor 20 is configured so that at least position measurements can be derived from the optical data stream. Speed measurements may preferably also be derived from the optical data stream.

The system for monitoring vehicles 1 also comprises components making it possible to process data, such as a processor, a memory, communication buses, etc. In so far as these other components are only specific in terms of the process that they execute and the instructions they contain, they will not be detailed hereinafter.

The process implements, in a continuously repeated manner for a plurality of successive frames, several steps detailed below. Since the process for monitoring vehicles is a continuous process, the system for monitoring vehicles 1 typically implements the process for several days in a row without stopping.

Thus, in a continuously repeated manner, the radar sensor 10 emits (step S1) a stream of radar data representative of the detection of vehicles 3, 4 on the road 2 by the radar 10. Simultaneously, the optical sensor emits (step S2) a stream of optical data representative of the detection of vehicles 3, 4 on the road 2. It should be noted that the stream of (radar or optical) data is emitted even when no vehicle 3, 4 is present on the road 2, but the detection of the absence of vehicles 3, 4 on the road 2 also corresponds to vehicle detection information.

These streams of data obtained by the system for monitoring vehicles 1 are generally not synchronous, with the acquisition frequencies generally differing between the radar 10 and the optical sensor 20. In particular, since the radar 10 has to deal with many echoes in a wide detection range, the refresh rate is generally more limited than that of an optical sensor 20. Likewise, the radar detection range 11 and the second detection range 21 are not exactly the same, albeit because the radar sensor 10 and the optical sensor 20 are generally arranged at different locations in the system for monitoring vehicles 1. The process therefore comprises (step S3) a temporal readjustment in synchronized frames and a spatial matching in a shared spatial marker which is spatially fixed, preferably linked to the road 2, of the radar data and of the optical data. The temporal readjustment consists in temporally matching the radar data and the optical data, for example by making a selection from the data and/or an interpolation on the data. The spatial matching in a spatial marker aims to spatially match the position measurements derived from the optical data and the radar data. The marker linked to the road 2 is preferably two-dimensional and is for example the surface of the road 2 on which the vehicles 3, 4 are spatially organized, and which may be provided with coordinates (x, y). This is typically a plane, or a surface approximating a plane.

It is possible to convert the data in order to express them in this spatial marker. For example, for the radar 10, the data acquired comprise a distance and an angular position in a marker which is polar relative to the radar 10. In order to express them in the spatial marker linked to the road, it is sufficient to know the position of the radar in this spatial marker, for example by means of position parameters input during the installation of the system for monitoring vehicles 1. These are for example the vertical height of the radar 10 relative to the surface of the road 2, and the orientation of the radar detection range relative to the traffic lanes 2a, 2b. The same applies for the optical data originating from the optical sensor 20. Since the spatial marker is the same for the radar data and the optical data, they are now spatially matched.

This then gives a set of measurement points each assigned to first characteristics derived from the radar data and second characteristics derived from the optical data. The first characteristics, originating from the radar data, comprise position measurements and speed measurements. The second characteristics, originating from the optical data, comprise at least position measurements and preferably also speed measurements.

Such characteristics are made immediately available for certain sensors. For example, the radar data comprise speed measurements. It may occasionally be necessary to carry out an advanced processing of the data acquired in order to be able to emit the stream of data. For example, in the case in which the optical sensor 20 is an optical image sensor acquiring images of the second detection range 21 of the road 2, there may be an analysis of the images acquired, involving a pattern recognition in order to be able to determine, utilizing several successive frames, characteristics such as a position associated with the measurement points. Advantageously, the pattern recognition may be implemented by a neural network.

The process next comprises the determination of vehicle trackings, which aims to individually follow a vehicle over time, and more specifically to follow characteristics linked to said vehicle over time, such as the speed thereof or the position thereof. Radar vehicle trackings are determined (step S4) from the first characteristics derived from the radar data and optical vehicle trackings are determined (step S5) from the second characteristics derived from the optical data.

Trackings are established in a conventional manner. Typically, in order to determine radar vehicle trackings, a first segmentation is carried out which groups together, in first clusters, measurement points having first characteristics that evolve in a similar way over several consecutive frames. In order to determine optical vehicle trackings, a second segmentation is carried out which groups together, in second clusters, measurement points having second characteristics that evolve in a similar way over several consecutive frames, the following over time of a second cluster forming an optical vehicle tracking. For example, the vehicle trackings may make use of a Kalman filter.

It should be noted that the number of vehicle trackings is variable based on the movement of the vehicles 3, 4 on the road 2. It should be noted that, in the absence of vehicles 3, 4 on the road 2, the tracking number may be zero. The vehicle tracking may be subordinate to conditions relating to the characteristics of the measurement points, for example a non-zero speed or position measurements which are different to those given by the traffic highway 2 in the absence of traffic. Indeed, it is a question of differentiating the vehicles 3, 4 from the more or less static environment appearing in the detection ranges: signposts, roadsides, plants, etc. The vehicle tracking may moreover be implemented over only a portion of the measurement points corresponding to the areas in the detection ranges 11, 21 in which vehicles 3, 4 are liable to appear.

The tracking of a vehicle is associated with parameters of the vehicle 3, 4, derived from the characteristics of the measurement points of the cluster. For example, a speed may be attributed to the vehicle 3, 4, typically starting from a mean or another value derived from the speeds assigned to the measurement points corresponding to said vehicle 3, 4. Aside from the parameters derived from the characteristics of the measurement points, it is possible to determine parameters assigned to a tracked vehicle 3, 4 which only exist through the cluster of measurement points, for example by the spatial distribution of the measurement points defined by the position measurements. In particular, it is possible to associate dimensions such as the length or the width of the vehicle which is being tracked from the extent of the spatial distribution of the measurement points. It is then possible to assign, based on the dimensions assigned to said vehicle, a dimension class to a vehicle tracking. Thus, the classes may make a distinction between heavy trucks such as a truck 4 and light vehicles such as a car 3 on the basis of their respective dimensions, these two classes of vehicles not being subject to the same speed limits.

A comparison (step S6) of similarity between the radar vehicle trackings and the optical vehicle trackings is then carried out. Typically, each radar vehicle tracking is compared to each optical vehicle tracking, although the comparison may relate only to a selection of trackings. This comparison of similarity is based at least on the presence of shared measurement points over several consecutive frames between a radar vehicle tracking and an optical vehicle tracking. Measurement points are considered to be shared when said shared measurement points have spatial and temporal correspondence which makes it possible to consider that said shared measurement points are taking account of the same situation on the traffic lane, at the same time and in the same place, even if they do not coincide exactly spatially.

The presence of shared measurement points shows a positional coincidence between the vehicle 3, 4 tracked by radar tracking and the vehicle 3, 4 tracked by optical tracking. The comparison may relate directly to position characteristics of measurement points, or to respective position parameters assigned to the vehicles of the compared trackings, these parameters being derived from the characteristics of the measurement points. The comparison of similarity therefore aims to establish that it is the same vehicle 3, 4. A radar vehicle tracking and an optical vehicle tracking are therefore similar when it is considered that the same vehicle is being tracked. It is sufficient for example to use thresholds of difference between position characteristics of measurement points, or between the respective position parameters assigned to the vehicles of the compared trackings. Other characteristics or parameters are preferably taken into account based on those available. In particular, the comparison of similarity may also be based on the fact that not particularly different speeds are assigned to the vehicle 3, 4 tracked by radar tracking and to the vehicle 3, 4 tracked by optical tracking.

During this comparison of similarity, it is therefore determined either that a radar vehicle tracking and an optical vehicle tracking are similar, or that said radar vehicle tracking and said optical vehicle tracking are similar. Matching of similar radar trackings and optical vehicle trackings is preferably carried out. A relationship is therefore established between a radar tracking and a similar optical tracking. The comparison is preferably made with criteria which make it possible to ensure that a tracking can only be similar to a single other tracking, unless in order to demonstrate a measurement problem. This is because a tracking is representative of the individual presence of a vehicle 3, 4, and the individual presence of a vehicle 3, 4 cannot be similar to the presence of another, different, vehicle. However, it may arise that a radar vehicle tracking does not have a similar optical vehicle tracking, or on the contrary that an optical vehicle tracking does not have a similar radar vehicle tracking.

Indeed, the different characteristics of the sensors which are the source of the data used to establish the vehicle trackings lead to variations in this data and therefore in the abilities to establish the vehicle trackings. As explained above, the radar sensor 10 can, due to multiple bounces of the waves causing false detections, give rise to false radar trackings. Conversely, the inefficiency of the Doppler technology for stationary vehicles 3, 4 may lead to lost tracking of a vehicle which is stationary but nonetheless present. Likewise, a radar tracking requires a relatively large number of measurement points over several frames in order to reliably establish a radar tracking, which may slow down the establishing of a radar tracking when a vehicle appears in the radar detection range 11, as is the case for the second car 3*a* in the example of FIG. 1. However, a radar tracking is very robust to weather conditions (rain, for example) or environmental conditions (light levels, for example), such that it may be the case that the presence of a vehicle 3, 4 is reflected by a radar tracking, without a similar optical tracking since the optical sensors are not as robust. Moreover, the speed measurements established by a radar are highly precise and robust.

A time-of-flight optical sensor 20 such as a lidar may also be subject to false detections, for example in the case of the waves bouncing on reflective planar surfaces such as long puddles of water, an extremely wet road or during heavy rain with large raindrops. It is also possible occasionally to observe range losses under disadvantageous weather conditions (dense fog, snow, etc.). The range may also be affected by the nature of the surfaces of the moving vehicles 3, 4, with low reflection limiting the detection range. Dazzling (saturation) may also occur on reflective signs or artifacts created by reflectors.

An optical image sensor 20 requires an extremely precise calibration which must be renewed over time in order to be able to carry out measurements of speed and distance from the images acquired. Such a calibration may for example be carried out with a projection of a test patent or by acquiring stereo images. There may therefore be a lack of precision which evolves over time. In addition, the data which can be derived from an optical image sensor 20 may be negatively impacted by weather conditions (rain, fog, etc.) or low light levels. On the other hand, the optical sensors 20 make it possible to continue to detect a stationary vehicle, and require fewer measurement points or frames to establish a tracking, which makes it possible to quickly establish an optical tracking when a vehicle 3, 4 appears in the second detection field 21, more quickly than with a radar 10, and therefore before the radar tracking appears. The optical sensor 20 also enables more precise determination of characteristics such as measurements of speed, position or dimensions.

The radar 10 and the optical sensor 20 may thus be considered to utilize independent and complementary technologies, in the sense that their defects and lack of precision are not only independent but can compensate for one another. It is these different properties which are utilized by the process, via the comparison of similarity and the matching of similar radar trackings and optical trackings. There are several ways which make it possible to take advantage of the differences between the radar trackings and the optical trackings.

First of all, it is possible to eliminate (step S7) the radar vehicle trackings for which no optical vehicle tracking is similar, in order to retain only the radar vehicle trackings for which at least one optical vehicle tracking is similar. This approach makes it possible to suppress radar trackings which might have arisen from false radar detection, caused by the bouncing of the radar waves, since they do not correspond to any vehicle 3, 4 tracked by an optical vehicle tracking. It is then no longer necessary to filter the radar trackings as before, thereby improving the detection reliability and making it possible to monitor vehicles 3, 4 which would otherwise not have been monitored due to the filtering of their radar tracking. In the example of FIG. 1, the first car 3 and the truck 4 are in the same direction seen from the radar 10. If they are moving at similar speeds, they will give rise to radar trackings having similar characteristics, which would have been suppressed during the filtering implemented in the prior art. By virtue of the proposed process, which makes the filtering redundant, the two trackings are retained and the two vehicles can be monitored.

Once only those radar vehicle trackings for which at least one optical vehicle tracking is similar are retained, the monitoring (step S8) of a parameter derived from first characteristics of a retained radar vehicle tracking is carried out. The first characteristics used for the control are preferably at least the speed measurements obtained by the radar, and the parameter is therefore the speed of the vehicle 3, 4 tracked by a retained radar vehicle tracking. Indeed, as explained above, the radar makes it possible to obtain highly precise speed measurements, the utilization of which makes it possible to make do with very small margins and therefore makes it possible to carry out monitoring of vehicles with a high degree of reliability and precision. This approach therefore aims to be able to utilize the precision of the radar for speed measurements while avoiding the disadvantages associated with the possibility of false radar trackings.

It is also possible to compensate for the disadvantages of the radar in terms of stationary vehicles 3, 4. To this end, following the comparison of similarity between the only radar vehicle trackings and the optical vehicle trackings (step S6), a radar vehicle tracking can be maintained when said radar vehicle tracking previously had a similar optical vehicle tracking. Indeed, the optical tracking is not affected by a stationary vehicle 3, 4, due to maintaining the position measurements. When a vehicle 3, 4 is moving in the detection ranges 11, 21, a radar tracking of said vehicle 3, 4 and an optical tracking of said vehicle 3, 4, which trackings are similar, are matched. The stopping of the vehicle 3, 4 in the detection ranges 11, 21 may lead to the stopping of the radar vehicle tracking due to the disappearance of the Doppler effect, while the optical tracking continues, since the latter does not utilize the Doppler effect. In the context of the process, it is possible to force the radar tracking to be maintained by virtue of the similar optical tracking persisting. It is then unnecessary to carry out stitching together in time of the stationary and started-up phases of the vehicle based on the only radar data, which is not particularly robust, and to still be able to utilize the first characteristics of a radar vehicle tracking retained in this way.

In addition, it should be noted that, while the speed measurements used for monitoring the speed are preferably those of a radar tracking, the position measurements used for monitoring the vehicle 3, 4, for example in order to ensure compliance with a stop ban in a specific zone of the road 2, are preferably position measurements from an optical tracking. This is because the optical sensors are more precise and robust for determining these position measurements.

Likewise, as mentioned above, the optical sensors enable better precision for determining the dimensions of the tracked vehicle 3, 4. Consequently, it is possible to assign, based on the dimensions assigned to said vehicle 3, 4, a dimension class to said optical vehicle tracking and/or to a retained radar vehicle tracking that is similar to said optical vehicle tracking. The parameter of the vehicle is then monitored based on the dimension class. Typically, the monitoring of the speed, derived from first characteristics of a retained radar vehicle tracking, consists in comparing the speed of the vehicle with speed limits which are determined by the dimension class. Use may also be made of other parameters such as the position, preferably derived from second characteristics, for example in order to ensure compliance with a driving ban for a class of vehicle in a particular zone (overtake ban for trucks 4, for example).

Another disadvantage of the radar 10 which can be compensated for is the relative delay of the radar 10 in establishing a radar tracking compared to an optical tracking. To this end, following the comparison of similarity between the only radar vehicle trackings and the optical vehicle trackings, when an optical vehicle tracking does not have a similar radar vehicle tracking, the parameter monitored can be derived from first characteristics corresponding to measurement points of the second cluster of said optical tracking. Thus, among the first characteristics derived from radar data, those corresponding to measurement points of the second aggregate of said optical tracking are used, despite the lack of radar tracking. Typically, this is a question of being able to utilize the radar speed measurements before a radar tracking has even been established. The monitored parameter then corresponds to a speed derived from the radar speed measurements, for example a mean. In so far as this approach aims to make it possible to utilize the first characteristics as quickly as possible when a vehicle 3, 4 appears in the detection ranges 11, 21, it is possible to make this approach conditional on a time limit after the onset of the optical tracking. This approach is particularly advantageous in the case of an application in monitoring the crossing of lights, where the stop line for the lights is close, or for monitoring speed at the rear of a vehicle at high speed. Waiting for a radar tracking to be established could then result in the monitoring being too late to be effective.

In the above description, mention has been made of a radar sensor 10 and a second remote sensor 20 which give rise to a radar vehicle tracking and to an optical vehicle tracking. However, it is possible to provide, aside from the radar 10, two optical sensors 20 giving rise to two optical trackings. The process is then implemented in a similar manner to that which has been described above, with a comparison of similarity which aims to match a radar tracking and two optical trackings obtained by means of a first optical sensor and a second optical sensor. Preferably, the two optical sensors 20 are then of different types, typically with a time-of-flight optical sensor and an optical image sensor.

The invention is not limited to the embodiment described and depicted in the attached figures. Modifications remain possible, particularly from the viewpoint of creating various technical characteristics or substituting technical equivalents, without departing from the scope of protection of the invention.

The invention claimed is:

1. A process for monitoring vehicles on a road comprising at least two traffic lanes, by a system for monitoring vehicles arranged in a fixed manner and comprising at least one radar sensor and a second remote sensor different from the radar sensor, the radar sensor operating over a radar detection range of the road covering at least two traffic lanes and emitting a stream of radar data representative of the detection of vehicles on the road, the second remote sensor operating over a second detection range of the road, the radar detection range and the second detection range being at least partially superimposed, wherein the second remote sensor is an optical sensor emitting a stream of optical data representative of the detection of vehicles on the road, said optical sensor being a time-of-flight optical sensor or an optical image sensor, the process comprising, in a continually repeated manner for a plurality of successive frames:
a) temporal readjustment and spatial matching in a fixed shared spatial marker of the radar data from the radar sensor and of the optical data from the optical sensor in order to obtain a set of measurement points each assigned with first characteristics derived from the radar data, the first characteristics comprising position measurements and speed measurements, and second characteristics derived from the optical data, the second characteristics comprising at least position measurements,
b) determination of radar vehicle trackings from the first characteristics derived from the radar data from the radar sensor and optical vehicle trackings from the second characteristics derived from the optical data from the optical sensor, comprising:
b1) a first segmentation which groups together, in first clusters, measurement points having first characteristics derived from radar data evolving in a similar way over several consecutive frames, the following over time of a first cluster forming a radar vehicle tracking,
b2) a second segmentation which groups together, in second clusters, measurement points having second characteristics derived from optical data evolving in a similar way over several consecutive frames, the following over time of a second cluster forming an optical vehicle tracking,
c) comparison of similarity between the radar vehicle trackings and the optical vehicle trackings, the comparison of similarity between a radar vehicle tracking and an optical vehicle tracking being based at least on the presence of shared measurement points over several consecutive frames in said radar vehicle tracking and said optical vehicle tracking, and matching of similar radar and optical vehicle trackings,
d) elimination of the radar vehicle trackings for which no optical vehicle tracking is similar, in order to retain only the radar vehicle trackings for which at least one optical vehicle tracking is similar, the process further comprising:
e) monitoring a parameter derived from first characteristics derived from radar data from radar sensor and corresponding to measurement points of a retained radar vehicle tracking for which an optical vehicle tracking is similar, and when an optical vehicle tracking does not have any similar radar vehicle tracking after the comparison of similarity between the radar vehicle trackings and the optical vehicle trackings, monitoring a parameter derived from first characteristics derived from radar data from the radar sensor and corresponding to measurement points of the second cluster of said optical vehicle tracking which does not have a similar radar vehicle tracking.

2. The process according to claim 1, wherein the system for monitoring vehicles is arranged in a fixed manner outside the traffic lanes of the road, at at least 0.5 m from the edge of a traffic lane and at a height of greater than 1.2 m from a surface of said traffic lanes.

3. The process according to claim 1, wherein the second characteristics of measurement points of an optical vehicle tracking comprise dimensions of the vehicle, the monitoring of a parameter comprising, based on the dimensions of said vehicle, assigning a dimension class to said optical vehicle tracking and/or assigning a dimension class to a retained radar vehicle tracking similar to said optical vehicle tracking, the parameter being monitored based on the dimension class.

4. The process according to claim 1, wherein the parameter monitored is derived from first speed measurements determined by means of the radar.

5. The process according to claim 1, wherein, following the comparison of similarity between the radar vehicle trackings and the optical vehicle trackings, a radar vehicle tracking is maintained even in the absence of a similar optical vehicle tracking, when said radar vehicle tracking previously had a similar optical vehicle tracking.

6. The process according to claim 1, wherein the optical sensor is an optical image sensor that acquires images of the second detection range of the road, and the emitting of the stream of optical data representative of the detection of vehicles on the road comprises an analysis of the images acquired, involving a pattern recognition in order to carry out a second segmentation which groups together, in second clusters, measurement points having second characteristics that evolve in a similar manner over time.

7. The process according to claim 1, wherein the optical sensor is a lidar sensor.

8. A system for monitoring vehicles comprising at least one radar sensor and a second remote sensor different from the radar sensor, the second remote sensor being an optical sensor, said optical sensor being a time-of-flight optical sensor or an optical image sensor, the system for monitoring vehicles being configured to be arranged in a fixed manner in the vicinity of a road comprising at least two traffic lanes, the radar sensor being configured to operate over a radar detection range of the road covering at least two traffic lanes and to emit a stream of radar data representative of the detection of vehicles on the road, the optical sensor being configured to operate over a second detection range of the road covering at least two traffic lanes and to emit a second stream of optical data representative of the detection of vehicles on the road, the radar detection range and the second detection range being at least partially superimposed,
   wherein the second remote sensor is an optical sensor emitting a stream of optical data representative of the detection of vehicles on the road, said optical sensor being a time-of-flight optical sensor or an optical image sensor,
the system for monitoring vehicles further comprising a processor, said processor being configured to, in a continually repeated manner for a plurality of successive frames:
  a) temporally readjust and spatially match in a fixed shared spatial marker of the radar data from the radar sensor and of the optical data from the optical sensor in order to obtain a set of measurement points each assigned with first characteristics derived from the radar data, the first characteristics comprising position measurements and speed measurements, and second characteristics derived from the optical data, the second characteristics comprising at least position measurements,
  b) determine radar vehicle trackings from the first characteristics derived from the radar data from the radar sensor and optical vehicle trackings from the second characteristics derived from the optical data from the optical sensor, wherein:
    b1) a first segmentation which groups together, in first clusters, measurement points having first characteristics derived from radar data evolving in a similar way over several consecutive frames, the following over time of a first cluster forms a radar vehicle tracking,
    b2) a second segmentation which groups together, in second clusters, measurement points having second characteristics derived from optical data evolving in a similar way over several consecutive frames, the following over time of a second cluster forms an optical vehicle tracking,
  c) compare a similarity between the radar vehicle trackings and the optical vehicle trackings, wherein said comparison is based at least on the presence of shared measurement points over several consecutive frames in said radar vehicle tracking and said optical vehicle tracking, and a match of similar radar and optical vehicle trackings,
  d) eliminate the radar vehicle trackings for which no optical vehicle tracking is similar, in order to retain only the radar vehicle trackings for which at least one optical vehicle tracking is similar,
the processor being further configured to:
  e) monitor a parameter derived from first characteristics derived from radar data from radar sensor and corresponding to measurement points of a retained radar vehicle tracking for which an optical vehicle tracking is similar, and
when an optical vehicle tracking does not have any similar radar vehicle tracking after the comparison of similarity between the radar vehicle trackings and the optical vehicle trackings, to monitor a parameter derived from first characteristics derived from radar data from the radar sensor and corresponding to measurement points of the second cluster of said optical vehicle tracking which does not have a similar radar vehicle tracking.

* * * * *